(12) United States Patent
Chung et al.

(10) Patent No.: US 9,454,156 B2
(45) Date of Patent: Sep. 27, 2016

(54) METHOD FOR EXTRACTING CURB OF ROAD USING LASER RANGE FINDER AND METHOD FOR LOCALIZING OF MOBILE ROBOT USING CURB INFORMATION OF ROAD

(71) Applicant: Korea University Research and Business Foundation, Seoul (KR)

(72) Inventors: Woojin Chung, Seoul (KR); Hyunsuk Lee, Seoul (KR)

(73) Assignee: Korea University Research And Business Foundation, Seoul (KR)

( * ) Notice: Subject to any disclaimer, the term of this patent is extended or adjusted under 35 U.S.C. 154(b) by 22 days.

(21) Appl. No.: 14/521,699

(22) Filed: Oct. 23, 2014

(65) Prior Publication Data

US 2016/0011594 A1 Jan. 14, 2016

(30) Foreign Application Priority Data

Jul. 9, 2014 (KR) ........................ 10-2014-0086346

(51) Int. Cl.
| | |
|---|---|
| G05D 1/02 | (2006.01) |
| G01C 21/14 | (2006.01) |
| G01C 21/16 | (2006.01) |
| G01C 21/18 | (2006.01) |
| G01C 3/08 | (2006.01) |
| G01S 17/42 | (2006.01) |
| G01S 7/48 | (2006.01) |
| G01S 17/93 | (2006.01) |

(52) U.S. Cl.
CPC ............... *G05D 1/0231* (2013.01); *G01C 3/08* (2013.01); *G01S 7/4802* (2013.01); *G01S 17/42* (2013.01); *G01S 17/936* (2013.01); *Y10S 901/01* (2013.01)

(58) Field of Classification Search
CPC ............... G05D 1/021; G05D 2201/0212; G05D 2201/0213; G01C 21/12–21/18
USPC ............ 700/250, 253; 701/23, 28, 448, 480, 701/500, 501, 514
See application file for complete search history.

(56) References Cited

U.S. PATENT DOCUMENTS

| | | | |
|---|---|---|---|
| 8,996,228 B1* | 3/2015 | Ferguson | G01C 21/3461 348/118 |
| 2005/0149251 A1* | 7/2005 | Donath | G01C 21/26 701/532 |
| 2010/0017060 A1* | 1/2010 | Zhang | G01S 7/4802 701/41 |
| 2010/0030473 A1* | 2/2010 | Au | G06K 9/00791 701/301 |
| 2012/0050198 A1* | 3/2012 | Cannon | A63F 13/02 345/173 |
| 2014/0067187 A1* | 3/2014 | Ferguson | B60W 30/00 701/28 |
| 2014/0266803 A1* | 9/2014 | Bulan | G06K 9/00785 340/932.2 |
| 2015/0097412 A1* | 4/2015 | Smith | E21C 41/16 299/1.05 |

* cited by examiner

*Primary Examiner* — Fadey Jabr
*Assistant Examiner* — Yazan Soofi

(57) ABSTRACT

The invention relates to a method for extracting a curb of a road using a laser range finder and a method for localizing of a mobile robot using curb information of a road. The method for extracting the curb of the road using the laser range finder includes extracting a road surface and line segments from scan data of the laser range finder, extracting a plurality of curb candidate line segments among the line segments on the basis of an angle between the road surface and the line segment, extracting a plurality of curb candidates having a plurality of curb properties, wherein each of the plurality of curb candidates is generated by combining the couple of the curb candidate line segments, and applying the plurality of the curb candidates to a Kernel Fisher Discriminant Analysis to extract a final curb.

11 Claims, 12 Drawing Sheets

(a)

(b)

METHOD FOR EXTRACTING CURB OF ROAD USING LASER RANGE FINDER AND METHOD FOR LOCALIZING OF MOBILE ROBOT USING CURB INFORMATION OF ROAD

CROSS-REFERENCE TO RELATED APPLICATION

This application claims the benefit under 35 U.S.C. §119(a) of Korean Patent Application No. 10-2014-0086346, filed on Jul. 9, 2014, in the Korean Intellectual Property Office, the entire disclosure of which is incorporated herein by reference.

FIELD OF THE INVENTION

The invention relates to a method for extracting a curb of a road using a laser range finder and a method for localizing of a mobile robot using curb information of a road and in particular to a method for extracting a curb of a road using a laser range finder and a method for localizing of a mobile robot using curb information of a road for extracting a curb in a semi-structured road environment having little change of the road shape and measuring a position of the mobile robot using the extracted curb, a differential global positioning system (DGPS), and an inertial measurement unit (IMU).

BACKGROUND DESCRIPTION OF THE RELATED ART

Environmental recognition and a localization are important issues for an outdoor mobile robot which performs specialized duties, such as patrolling or servicing in a road. The outdoor mobile robot performing said duties repeatedly drives the same route based on map information provided in advance. The environmental recognition and the localization of the mobile robot are important for a safe navigation of the outdoor mobile robot based on the map.

The outdoor environments typically have two following features. One is that surrounding topography is not standardized. The other is that there are many changes by weather or seasons. Therefore, various researches have proceeded to overcome this environmental uncertainty.

For example, "DARPA Challenge" which is presented in a paper of Sebastian Thrun, et al., "Stanley: The Robot That Won the DARPA Grand Challenge" (Journal of Field Robotics, vol. 23 no. 9, pp. 661-692, 2006) and a paper of Martin Buehler, Karl lagnemma, Sanjiv Singh (Eds.), "The DARPA Urban Challenge: Autonomous Vehicles in City Traffic" (Springer, 2010.) is a successful case of an autonomous navigation of the mobile robot in outdoor environments.

The DARPA Challenge suggests various localization techniques and navigation strategies to maneuver successfully in spite of the uncertainty in the outdoor environments. However, the DARPA Challenge has certain disadvantages. First, many pieces of costly equipment are required. Second, complex system configurations are required.

For the navigation of the mobile robots in outdoor environments, the localization is generally conducted by a combination of information from multiple sensors. Among these sensors, the combination of Global Positioning System (GPS) and Inertial Measurement Unit (IMU) has been widely used. A paper of Solovev, A., "Tight Coupling of GPS, Laser Scanner, and Inertial Measurements for Navigation in urban Environments" (Position, Location and Navigation Symposium, 2008.) and a paper of S. Panzieri, F. Pascucci, and G. Ulivi "An outdoor navigation system using GPS and inertial platform" (IEEE/ASME Trans. Mechatronics, vol. 7, no. 2, pp. 134-142, June, 2002.) are typical cases using the combination of GPS and IMU.

However, GPS measurements are degraded in urban environments surrounded by tall buildings because of multipath errors and blocked satellite in view. This results in imprecise measurements.

To solve the abovementioned GPS errors in urban environments, methods to be aware of the driving environment of the mobile robots and to use it to the localization are presented in many paper, such as a paper of M Joerger and B Pervan, "Range-Domain Integration of GPS and Laser-scanner Measurements for Outdoor Navigation" (Proceedings of the ION GNSS, 2006.).

Among the methods, the technique with a vision sensor has been widely used in recent years. In a paper of Georgiev, A. and Allen, P. K., "Localization Methods for a Mobile Robot in Urban Environments" (IEEE Transactions on Robotics, Vol. 20, Issue 5, 2004.), images of buildings are extracted using a camera, and the position of the mobile robot is corrected by matching a pre-registered map.

However, the vision sensor which is suggested in the paper has some disadvantages. It is hard to operate at night and it is strongly influenced by weather changes because it is not strong in low illumination.

Therefore, Laser Range Finder (LRF) is used in the environmental recognition technique, which is strong in low illumination of driving environments and weather change. In a paper of Daniel Maier and Alexander Kleiner, "Improved GPS Sensor Model for Mobile Robots in Urban Terrain" (IEEE International Conference on Robotics and Automation, pp. 4385-4390, May, 2010.), an awareness of a 3D environment using a LRF is conducted to consider obscured GPS satellites due to tall buildings. However, the localization is conducted with the environmental recognition because only a small amount of geometric information exists in comparison with the wide area.

Generally, the urban road environment is paved and curbs are the boundaries of the roads. These environments are defined as a semi-structured road environment. In the semi-structured road environment, there is little change of the road shape.

Therefore, it is easy to extract the road features, especially the curb, using geometric features. For this reason, the curb has been widely used for navigation strategies and localization techniques in road environments. In a paper of Wijesoma W. S., Kodagoda K. R. S., and Balasuriya A. P., "Road-Boundary Detection and Tracking Using Ladar Sensing" (IEEE Trans. Robot. Automat. vol. 20, pp. 456-464, June 2004.), a technique to extract the curb by using the LRF in the road environment is suggested. In a paper of M. Jabbour and P. Bonnifait, "Global localization robust to gps outages using a vertical radar" (9th International Conference on Control, Automation, Robotics and Vision, vol. 1, no. 5, pp. 1013-1018, 2006.), for localization of vehicle, one side of the curb was extracted using a vertical radar. However, this technique reduces a lateral error of the vehicle through map matching of the extracted curb point, but does not correct the orientation of the mobile robot.

BRIEF SUMMARY OF THE INVENTION

The object of the invention is to solve the above problems and in particular, to provide a method for extracting a curb of a road using a laser range finder (LRF) capable of effectively extracting the curb using a single laser range finder in semi-structured road environments having uncertainty.

The other object of the invention is to solve the problems and in particular, to provide a method for localizing of a mobile robot using curb information of road capable of accurately localizing of the mobile robot by means of the extracted curb information, a differential global positioning system (DGPS) and an inertial measurement unit (IMU).

To achieve the object of the invention, the invention provides a method for extracting a curb of a road using a laser range finder comprising following steps: (a) extracting a road surface and line segments from scan data of the laser range finder; (b) extracting a plurality of curb candidate line segments among the line segments on the basis of an angle between the road surface and the line segment; (c) extracting a plurality of curb candidates having a plurality of curb properties, wherein each of the plurality of curb candidates is generated by combining the couple of the curb candidate line segments; and (d) applying the plurality of the curb candidates to a Kernel Fisher Discriminant Analysis to extract a final curb.

Herein, the step (c) comprises following steps: (c1) extracting a right curb candidate line segment and a left curb candidate line segment from the plurality of curb candidate line segments; (c2) calculating a difference between a distance to the extracted road surface and a distance to the right curb candidate line segment and/or the left curb candidate line segment; (c3) calculating an angular difference between the right curb candidate line segment and the left curb candidate line segment; (c4) calculating a difference between a road width and a distance between the right curb candidate line segment and the left curb candidate line segment; and (c5) extracting the curb candidates having the curb properties with values calculated in the step (c2), (c3), and (c4).

Further, vector data are extracted as the curb candidates and wherein elements of the vector date comprise the values calculated in the step (c2), (c3), and (c4).

Moreover, the step (d) comprises following steps: (d1) setting-up a discriminant function via applying a plurality of training data which are classified as a curb class and a non-curb class to the Kernel Fisher Discriminant Analysis; (d2) applying the curb candidate to the discriminant function to classify the curb candidate as one of the curb class and the non-curb class; and (d3) extracting the curb candidate, which is classified as the curb class, as the final curb in the step (d2).

Moreover, the discriminant function in the step (d1) is generated as an eigenvector maximizing an object function in a formula which is defined as $$J(\alpha) = \frac{\alpha^T S_B^\Phi \alpha}{\alpha^T S_W^\Phi \alpha}$$

(here, $J(\alpha)$ is the object function, $S_B^\Phi$ is a between-class variance matrix, $S_W^\Phi$ is a within-class variance matrix, and $\alpha$ is the eigenvector).

Moreover, in the step (d2), Mahalanobis distance between each class and the curb candidate is calculated, and the curb candidate is classified as one of the curb class and the non-curb class which possesses the smaller Mahalanobis distance.

Moreover, the Mahalanobis distance is calculated by $$d(y_{test}, \mu_c^\Phi) = \frac{(y_{test} - \mu_c^\Phi)^2}{(\sigma_c^\Phi)^2}$$

(here, $\mu_c^\Phi$ and $\sigma_c^\Phi$ are the mean and the standard deviations, respectively, of the training data, the curb class, and the non-curb class in a one-dimensional solution space).

Also, to achieve the other object of the invention, the invention provides a method for localizing of a mobile robot using curb information of a road comprising following steps: (A) predicting a position of the mobile robot by applying odometry information of the mobile robot to an Extended Kalman Filter; (B) applying a measurement value measured by a DGPS module installed on the mobile robot and an inertial sensor and the position of the mobile robot predicted in the step (A) to the Extended Kalman Filter to correct the position of the mobile robot predicted in the step (A); (C) extracting curb information of the road on the basis of scan data of a laser range finder which is installed on the mobile robot; and (D) applying the extracted curb information and the position of the mobile robot which is corrected in the step (B) to the Extended Kalman Filter to correct the position of the mobile robot which is corrected in the step (B).

Herein, in the step (C), the curb information is extracted by a method according to the method for extracting the curb of the road using the laser range finder.

Further, in the step (B), an error for the measurement value of the DGPS module comprises a HDOP (Horizontal Dilution of Precision) error and a Pseudo-range error which is a geometric error according to a geometric constellation of satellites; wherein an error for the measurement value of the inertial sensor comprises an orientation error; and wherein an error covariance applied to the Extended Kalman Filter comprises an error covariance for the measurement value of the DGPS module and an error covariance for the measurement value of the inertial sensor.

Moreover, in the step (D), the curb information comprises distance information between the mobile robot and the extracted curb, and angle information between the mobile robot and the curb, and wherein the error covariance for the curb information applied to the Extended Kalman Filter is calculated on the basis of an error between a predetermined line map and the distance and angle information.

According to the invention, it is possible to effectively extract the curb using a single laser range finder in semi-structured road environments.

Also, it is possible to accurately localize the mobile robot using the extracted curb information, the differential global positioning system (DGPS) and the inertial measurement unit (IMU).

DETAILED DESCRIPTION

Hereinafter, preferred embodiments according to the present invention will be explained in detail referring to attached drawings.

Road environments and a mobile robot according to the present invention will be explained, before explanation about a method for extracting a curb using a lager range finder according to the present invention.

Figure 1:
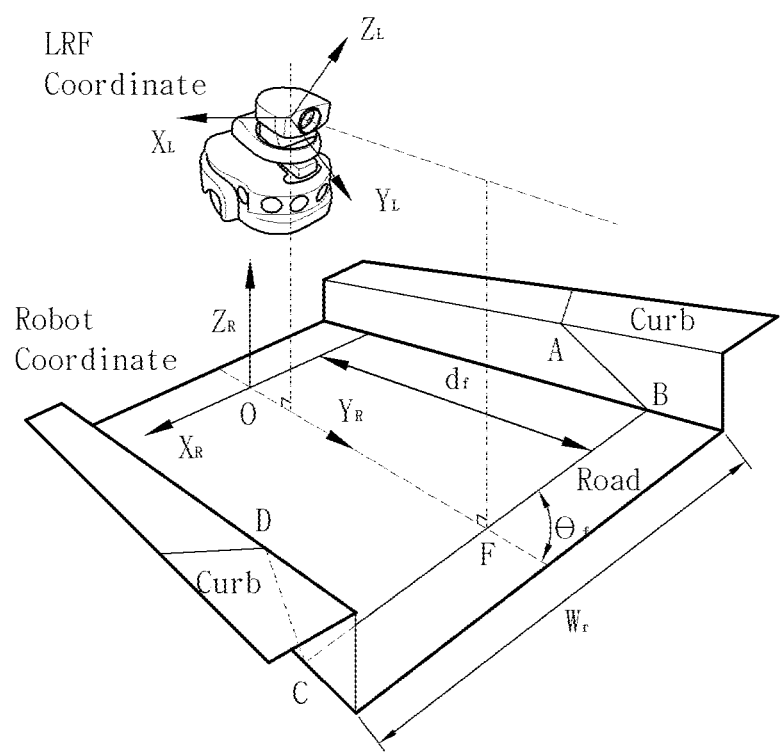
FIGS. 1 and 2 represent a structure of coordinate frames of a mobile robot and a laser range finder in semi-structured road environments.
Figure 2:
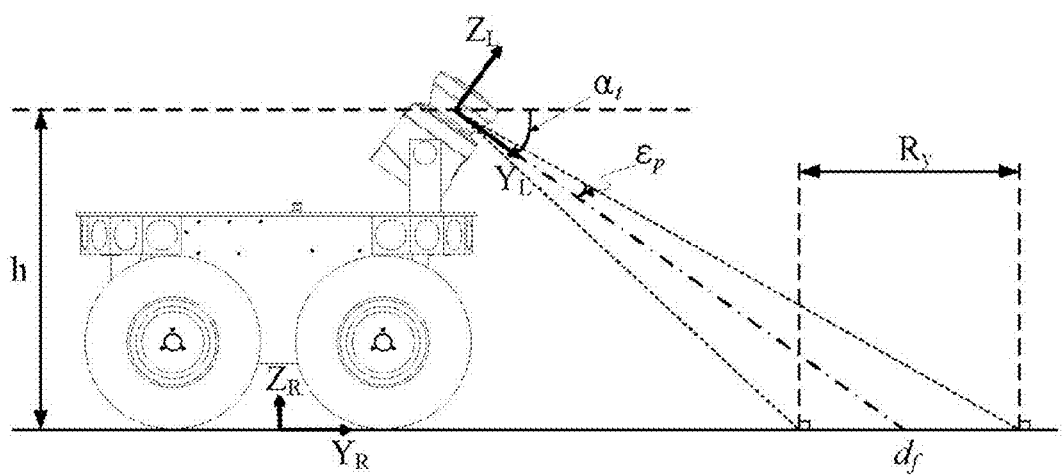

FIGS. 1 and 2 represent a structure of coordinate frames of a mobile robot and a laser range finder in semi-structured road environments. A single laser range finder having a tilting angle at is used to extract a road feature, such as a road surface, a curb and an obstacle. In flat road conditions, a look ahead distance of the laser range finder is $d_f$. The look ahead distance is determined by the tilting angle of the laser range finder. However, a pitch angle of the mobile robot is affected by an uneven road surface. Therefore, the look ahead distance of the laser range finder varies in a look ahead direction of the mobile robot.

Herein, a pitch angle tolerance $\epsilon_p$ is predetermined to consider a variation of a pitch angle. The variation of the road surface is analyzed by accumulated data of the laser range finder, and the pitch angle tolerance $\epsilon_p$ is assumed. Table 1 shows nomenclatures of each variable, and the variables are described with respect to a coordinate frame of the mobile robot.

TABLE 1

| Symbols | Meaning |
| --- | --- |
| $X_L, Y_L, Z_L$ | LRF local coordinate. |
| $X_R, Y_R, Z_R$ | Robot local coordinate |
| $w_r$ | Road width |
| $\alpha_t$ | Nominal tilt angle of a LRF |
| $\epsilon_p$ | Tolerance of pitch angle |
| $\theta_f$ | Angle between the detected road surface points and $Y_R$-axis |
| $d_f$ | Horizontal look ahead distance from the LRF origin to the road surface points |
| $(x_{C,R}, y_{C,R})$ | Coordinate of the right curb edge (point C) |
| $\theta_{C,R}$ | Angle between the right curb and $Y_R$-axis |
| $(x_{C,L}, y_{C,L})$ | Coordinate of the left curb edge (point B) |
| $\theta_{C,L}$ | Angle between the left curb and $Y_R$-axis |
| $R_y$ | Expected y range of the road surface points |

Hereinafter, the method for extracting the curb of the road using the laser range finder according to the present invention will be explained referring to FIG. 3.

Scan data is obtained according to scan of the laser range finder which is installed in the mobile robot S10. Then, the road surface and a line segment are extracted from the scan data S11. The method for extracting the road surface can be used various methods which are publicly known.

For example, the road surface is extracted from an expected observation region Ry by the laser range finder. When slope of three adjacent scan data is within a threshold, these scan data are considered to be the part of the road surface. For the parts of the road surface, the road surface is extracted as the line segment via a least-squares method. An angle $\theta_f$ and a distance $d_f$ from the mobile robot are extracted by the extracted line segment.

Figure 4:
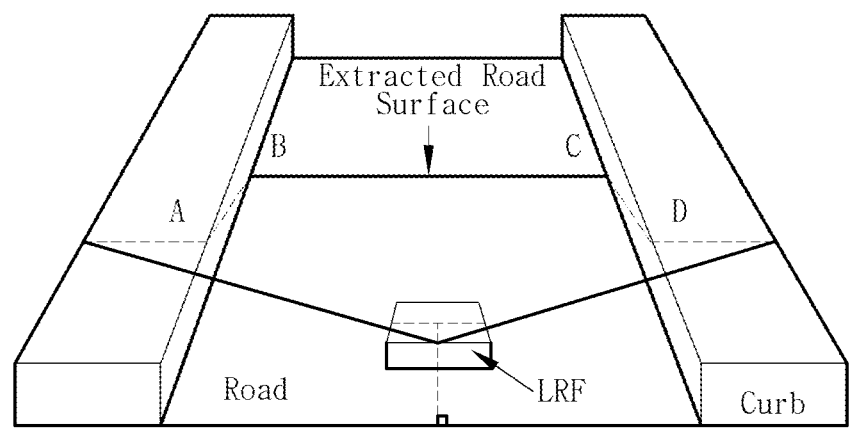
FIG. 4 represents an ideal model of the semi-structured road environments having the curb.

FIG. 4 represents an ideal model of the semi-structured road environments having the curb. As shown in FIG. 4, the feature of the semi-structured road environments is applied to extract a final curb which will be explained later.

Figure 3:
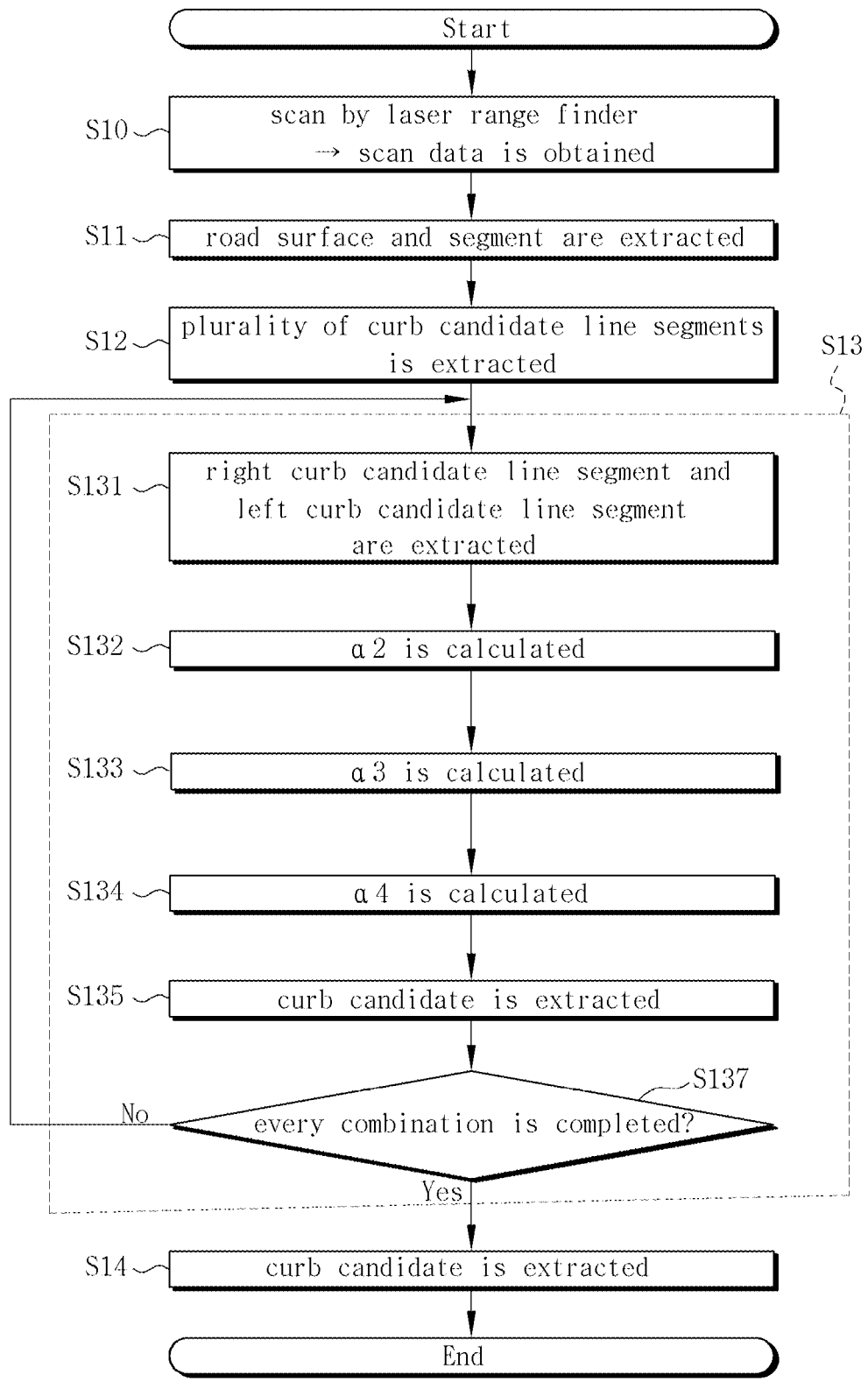
FIG. 3 represents a method for extracting a curb of a road using a laser range finder according to the present invention.

As shown in FIGS. 3 and 4, using the extracted road surface and the line segment in step 11, a plurality of curb candidate line segments are extracted S12. In one example of the present invention, the plurality of curb candidate line segments is extracted based on an angle between the line segment and the load surface.

As shown in FIG. 4, the angle difference between the orientation (AB and CD) of the curb and the slope (BC) of the road surface is 90° in the ideal road environments. Therefore, the angle between the road surface and the curb candidate line segment from the scan data is approximately 90°. Thus, in case that the angle between the line segment and the road surface is approximately 90°, a corresponding line segment is extracted as the curb candidate line segment. Formula 1 represents the above method.

$$a_1 = \frac{\pi}{2} \pm \varepsilon_c \qquad \text{Formula 1}$$

Here, $a_1 = |\theta_f - \theta_c|$, and $\epsilon_c$ is a tolerance. Also, $\theta_f$ and $\theta_c$ are the angle of the road surface and the angle of the line segment, respectively, in the coordinate of the mobile robot. When the difference of these two angles is within $90° \pm \epsilon_c$, the corresponding line segment is extracted as the curb candidate line segment.

When the curb candidate line segment is extracted as mentioned above, a plurality of curb candidates having a plurality of curb properties are extracted S13. Herein, each curb candidates are generated by randomly combining the couple of the curb candidate line segments. Referring to FIG. 3, a right curb candidate line segment and a left curb candidate line segment from the plurality of curb candidate line segments are extracted S131, and then the plurality of the curb properties for the right curb candidate line segment and the left curb candidate line segment are extracted via steps 132 to 134.

In one example of the present invention, three curb properties are applied to the plurality of the curb properties of the curb candidate, and three curb properties are extracted from interrelation between the right curb and the left curb.

In the first curb property $\alpha_2$, a difference between a distance $d_f$ to the extracted road surface and a distance to the right curb candidate line segment and/or the left curb candidate line segment is approximately 0, as shown in FIG. 4. Thus, difference $\alpha_2$ between the distance $d_f$ to the extracted road surface and the distance to the right curb candidate line segment and/or the left curb candidate line segment is calculated S132, and registered as the curb property of the right curb candidate line segment and the left curb candidate line segment.

In the second curb property as, an angular difference between the right curb (AB) and the left curb (CD) is approximately 0°, as shown in FIG. 4. Thus, the angular difference as between the right curb candidate line segment and the left curb candidate line segment is calculated S133, and registered as the curb property of the right curb candidate line segment and the left curb candidate line segment.

In the third curb property $\alpha_4$, a difference between a road width and a distance between the right curb and the left curb is approximately 0. Thus, the difference $\alpha_4$ between the distance between the right curb candidate line segment and the left curb candidate line segment and the road width is calculated S134, and registered as the curb property of the right curb candidate line segment and the left curb candidate line segment.

The curb properties as mentioned above may be represented as Formula 2.

$$a_2 = d_f - \text{avg}(y_{C,R}, y_{C,L})$$

$$a_3 = \theta_{C,R} + \theta_{C,L}$$

$$a_4 = w_r - w_c \qquad \text{Formula 2}$$

Herein, $\omega_r$ is the road width which is known via a line map, $\omega_c$ is the distance between the right curb candidate line segment and the left curb candidate line segment. Also, in one example according to the present invention, the mean of the distance between the mobile robot and the right curb candidate line segment and the distance between the mobile robot and the left curb candidate line segment is calculated as the first property.

Herein, if the curb is not extracted at right or left, that is, only one of the right curb candidate line segment and the left curb candidate line segment is extracted, the first curb property and the second curb property are calculated using one side of curb candidate line segment which is extracted, and the third property is assumed to be 0.

By means of the process as described above, the right curb candidate line segment and the left curb candidate line segment having the properties as defined Formula 2 are extracted as the curb candidate S135.

Then, when the property is extracted for every combination of the couple of the curb candidate line segment S137, the extraction of the curb candidate is completed. Herein, in the above described process, the curb candidate line segments are classified as the right curb candidate line segment or the left curb candidate line segment, and then every combination of the right side and the left side are applied to the process, as one example.

Herein, the curb candidate is extracted as vector data having elements which are the values calculated as the curb properties. The vector data of the curb candidate is represented as formula 3.

$$x_i = [a_2 a_3 a_4]^T \qquad \text{Formula 3}$$

When the extraction of the curb candidates is completed, the final curb is extracted S14. In one example of the present invention, the final curb is extracted using the Kernel Fisher Discriminant Analysis.

Hereinafter, referring to FIGS. 5 to 8, the process for extracting the final curb using the Kernel Fisher Discriminant Analysis in the method for extracting the curb according to the present invention will be described in detail.

Figure 5:
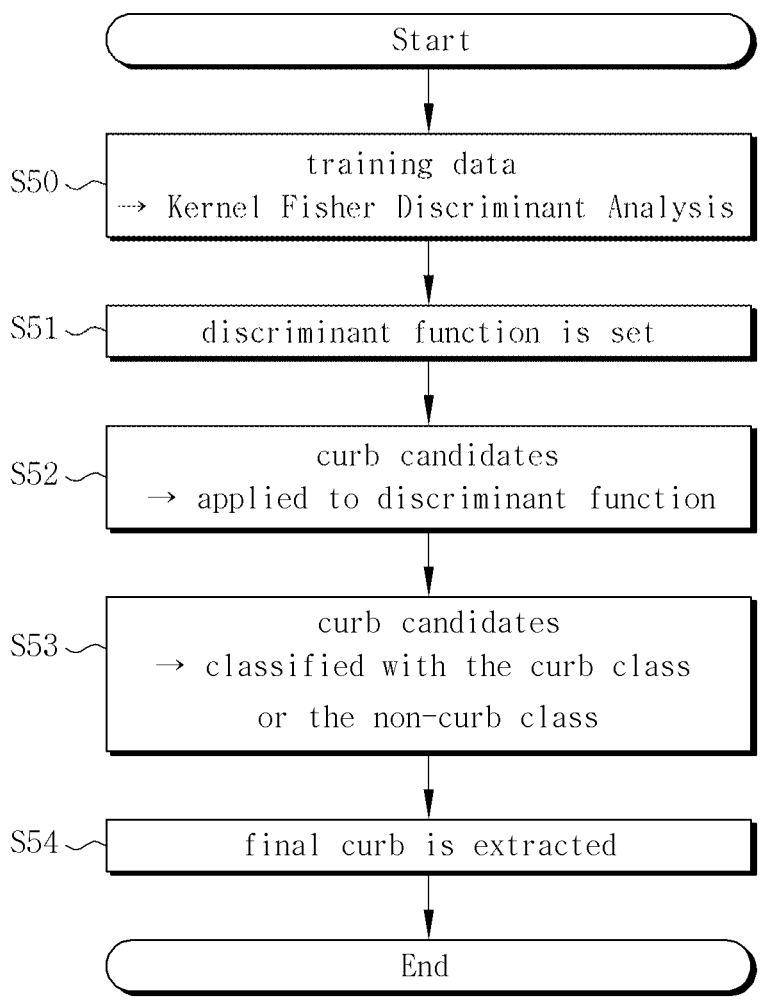
FIGS. 5 to 8 represent how to extract a final curb using Kernel Fisher Discriminant Analysis in the method for extracting the curb according to the present invention.
Figure 6:
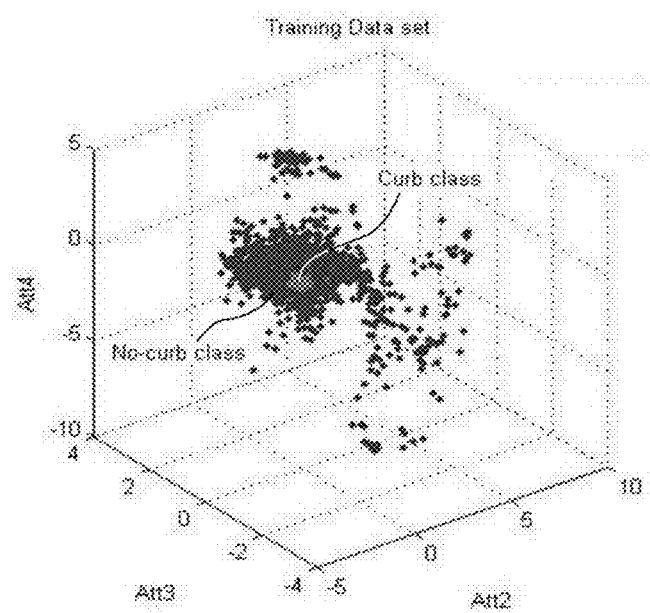
Figure 6:
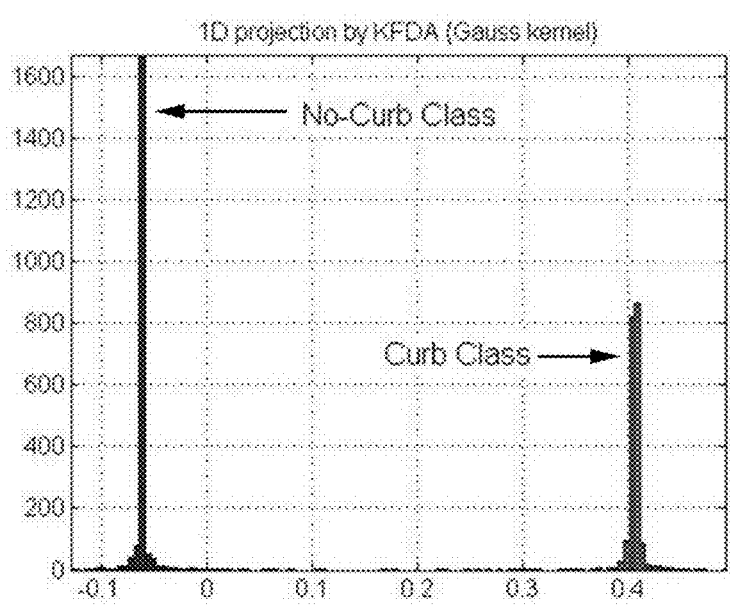

Referring to FIG. 5, a plurality of training data are applied to the Kernel Fisher Discriminant Analysis S50, such that a discriminant function is set S51. Herein, the plurality of the training data have class information, and are classified as a curb class or a non-curb class. Herein, each of class information has property information of the curb or property information of the non-curb, and the property information of the curb and the property information of the non-curb are clearly divided to be classified as the curb class or the non-curb class. FIG. 6 (a) shows the curb class corresponding to the curb candidate having the type of the data vector with 3 elements and the non-curb class in a three-dimensional space, and represents that the property of the curb class and the property of the non-curb class are clearly divided.

The Kernel Fisher Discriminant Analysis provides the discriminant function for optimal classification and reduction of dimensions in a kernel feature space F. In the present invention, by defining the discriminant function, an arbitrary data class can be predicted.

Herein, if $U_{training} = \{x_1, x_2, \ldots, x_n\}$ is a set of the training data, each sample that consists of numerical values of the class property is defined as $x_{training,i} \in R^3$. Also, to obtain equivalent effects among all class properties regarding the classification, the elements of each sample are normalized, as shown in formula 4.

$$x_i^{(j)} = \frac{x_i^{(j)} - \mu^{(j)}}{\sigma^{(j)}} \qquad \text{Formula 4}$$

In formula 4, $\mu^{(j)}$ and $\sigma^{(j)}$ are mean and standard deviation of each class properties.

In the present invention, the discriminant function a maximizing an object function in formula 5 in the kernel feature space F is determined by the Kernel Fisher Discriminant Analysis.

$$J(\alpha) = \frac{\alpha^T S_B^\Phi \alpha}{\alpha^T S_W^\Phi \alpha} \qquad \text{Formula 5}$$

Herein, $S_B^\Phi$ is between-class variance matrix, $S_W^\Phi$ and is within-class variance matrix. The between-class variance matrix and the within-class variance matrix are defined as the following formulas 6 and 7.

$$S_B^\Phi = \sum_c N_c (\kappa_c \kappa_c^T - \kappa \kappa^T) \qquad \text{Formula 6}$$

$$S_W^\Phi = K^2 - \sum_c N_c \kappa_c \kappa_c^T, \qquad \text{Formula 7}$$

with $$\kappa_c = \frac{1}{N_c} \sum_{i \in c} K_{ij}, \kappa = \frac{1}{N} \sum_i K_{ij}$$

Herein, N is the number of total training data samples and Nc is the number of class samples. The training data which are mapped to the kernel feature space F are represented by N×N matrix K. The Gaussian kernel is used to map the data to the kernel feature space F in formula 8.

$$K_{ij} = k(x_i, x_j) = \exp\left(-\frac{\|x_i - x_j\|^2}{2\sigma^2}\right) \qquad \text{Formula 8}$$

In Formula 8, the discriminant function which maximizes the object function is derived by the eigenvalue problem in formula 9. In order to project the training data to 1D solution space, the eigenvector corresponding to the largest eigenvalue is defined as the discriminant function for classification. The discriminant function is given by a vector of N×1.

$$S_B^\Phi \alpha = \lambda S_W^\Phi \alpha \qquad \text{Formula 9}$$

Figure 7:
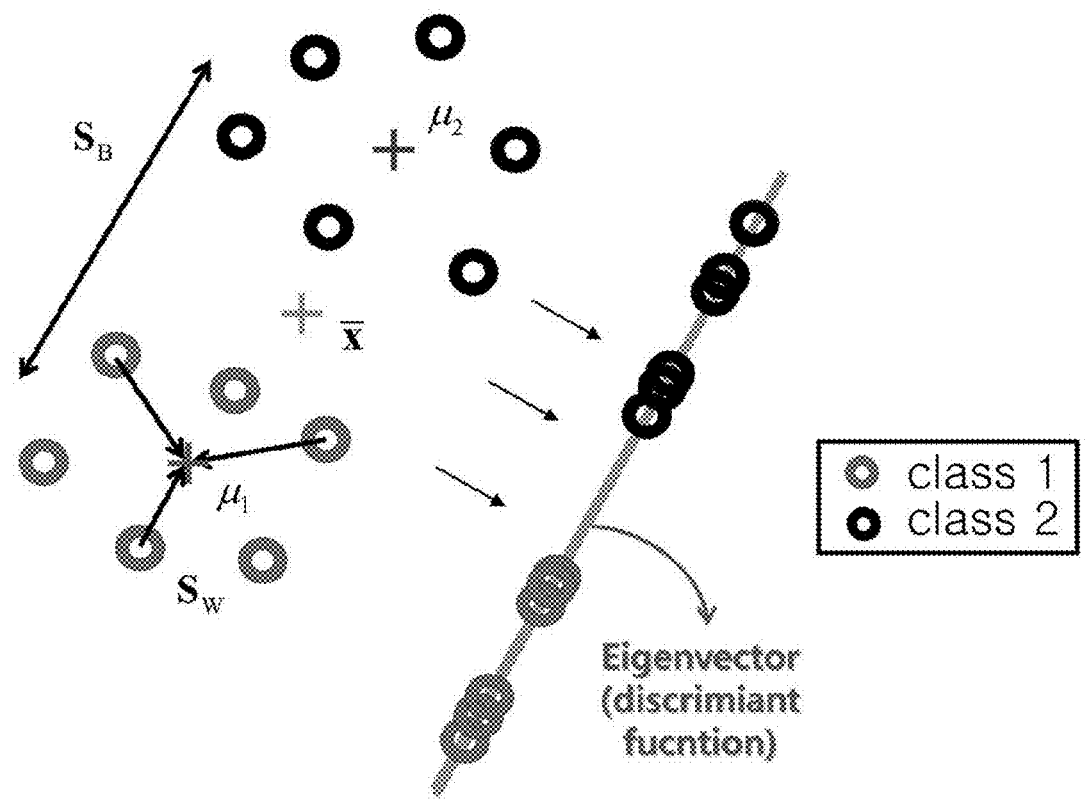

The classification is performed by obtaining an inner product of the data matrix K and the discriminant function α, as given by Formula 10. The training data matrix K is projected to the 1D solution space, as shown in FIG. 6(b), and the classification results are represented in the 1D solution space. FIG. 7 represents that two classes, i.e., the curb class and the non-curb class are projected to the 1D solution space and then classified.

$$y_{training} = \alpha \cdot K \quad \text{Formula 10}$$

When the discriminant function is set using the training data as mentioned above, the curb candidate is applied to the discriminant function S52. And then, the curb candidate is classified as the curb class or the non-curb class S53 by applying to the discriminant function, and finally, the curb candidate which is classified to the curb class is extracted as the final curb S54.

In more detail, the curb candidate which is not provided with the class information may be predicted by the discriminant function a using the training data. By using the training data, the curb candidate is projected to the 1D solution space. The curb candidate is mapped to the feature space by the Gaussian kernel and the test data. The projection of the test data to the solution space can be computed by formula 11.

$$y_{test} = \sum_{i}^{n} \alpha_i k(x_{training,i}, x_{test}) \quad \text{Formula 11}$$

The class properties of the training data in the 1D solution space are used to predict the class, that is the curb class and the non-curb data which the curb candidate belong to. The class of the curb candidate is calculated by a mahalanobis distances between each class and the curb candidate. Formula 12 represents the mahalanobis distances.

$$d(y_{test}, \mu_c^\Phi) = \frac{(y_{test} - \mu_c^\Phi)^2}{(\sigma_c^\Phi)^2} \quad \text{Formula 12}$$

Herein, $\mu_c^\Phi$ and $\sigma_c^\Phi$ are the mean and the standard deviations, respectively, of the training data, the curb class and non-curb class, in the 1D solution space.

Figure 8:
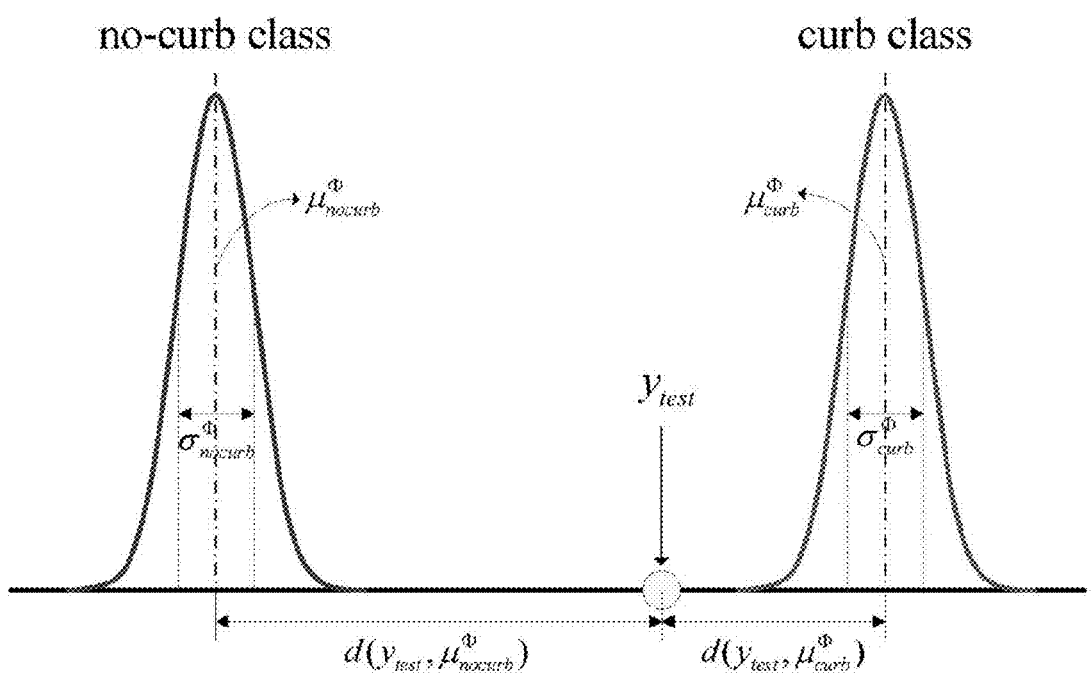

FIG. 8 represents the mahalanobis distance between each class and the curb candidate. The curb candidate which has the smaller mahalanobis distance is extracted as the final curb. That is, if the mahalanobis distance of the curb class is smaller than the mahalanobis distance of the non-curb class, the curb candidate is classified as the curb class.

Hereinafter, a method for localizing of a mobile robot using curb information of a road will be explained more detail, referring to FIGS. 9 to 12. In one example of the present invention, the method for extracting the curb mentioned above is applied to the method for localizing according to the present invention.

Figure 9:
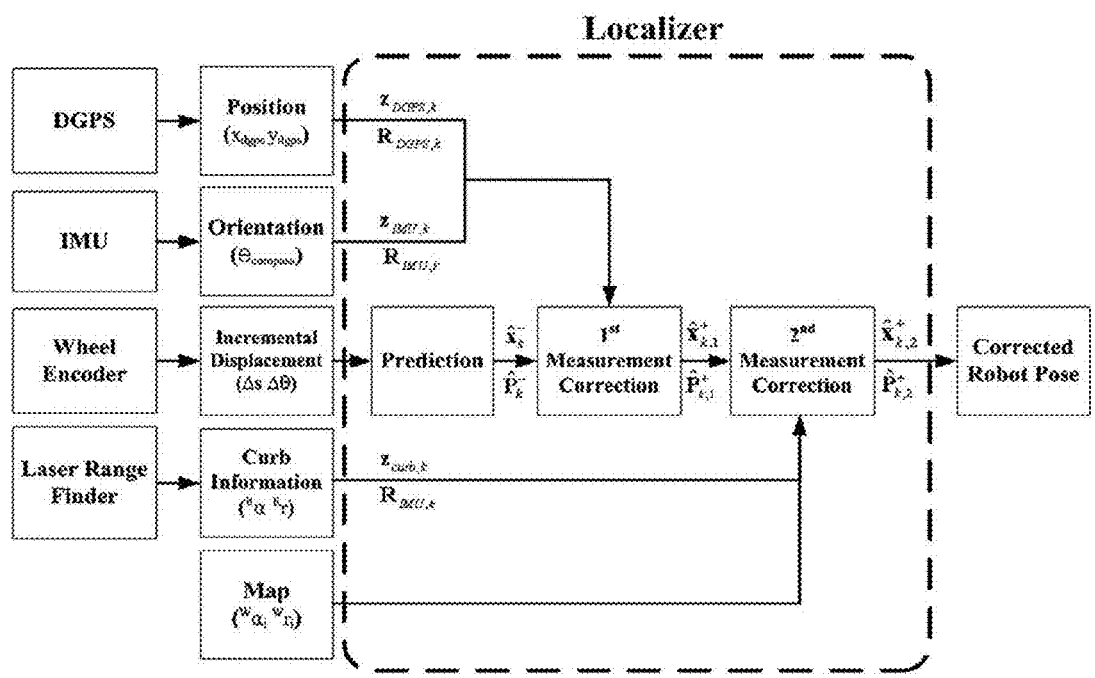
FIGS. 9 to 12 represent a method for localizing of the mobile robot using curb information according to the present invention.

FIG. 9 represents the method for localizing of the mobile robot. Referring to FIG. 9, the mobile robot according to the present invention comprises a DGPS (Differential Global Positioning System) module, an IMU (Inertial Measurement Unit), a wheel encoder detecting odometry information, and the laser range finder.

The position of the mobile robot is predicted by the incremental distance which is detected by the wheel encoder. In one example according to the present invention, the odometry information is applied to the Extended Kalman Filter, such that the position of the mobile robot is predicted.

In the predicting process by Extended Kalman Filter, the state of the mobile robot and the error covariance of the odometry information are provided. Formula 13 represents the state of mobile robot according to the odometry information, and Formula 14 represents an error covariance matrix.

$$\hat{x}_k^- = f(\hat{x}_{k-1}^+, u_{k-1}) \quad \text{Formula 13}$$

$$P_k^- = F_{k-1} P_{k-1}^+ F_{k-1}^T + G_{k-1} Q_{k-1} G_{k-1}^T \quad \text{Formula 14}$$

Herein, if the available measurement value is provided to the Extended Kalman Filter from the sensor, an estimation step of the Extended Kalman Filter, that is, a location correction step of the method for localizing according to the present invention is conducted.

The Kalman gain, the corrected state and the corrected error covariance in the estimation step of the Extended Kalman Filter are described by formulas 15 to 17, and the location of the mobile robot is corrected by using formulas 15 to 17. The location correction of the mobile robot will be explained in more detail later.

$$K_k = P_k^- H_k^T [H_k P_k^- H_k^T + R_k]^{-1} \quad \text{Formula 15}$$

$$\hat{x}_k^+ = \hat{x}_k^- + K_k(z_k - h(\hat{x}_k^-, k)) \quad \text{Formula 16}$$

$$P_k^+ = [1 - K_k H_k] P_k^- [1 - K_k H_k]^T + K_k R_k K_k^T \quad \text{Formula 17}$$

The prediction step for localizing of the mobile robot will be explained again in more detail below. The odometry information from the measurement value of the wheel encoder is used to predict a pose of the mobile robot in prediction step for localizing of the mobile robot. Herein, the pose of the mobile robot comprises the location of the mobile robot, and the orientation angle of the mobile robot, that is, the heading direction of the mobile robot.

For the incremental distance $\Delta s_{k-1}$ and the orientation angle $\Delta \theta_{k-1}$, the predicted pose of the mobile robot at sampling time k is given by Formula 18.

$$\hat{x}_k^- = f(\hat{x}_{k-1}, u_{k-1}) = \begin{bmatrix} \hat{x}_{k-1}^- + \Delta s_{k-1} \cos(\hat{\theta}_{k-1}^- + \Delta \theta_{k-1}/2) \\ \hat{y}_{k-1}^- + \Delta s_{k-1} \sin(\hat{\theta}_{k-1}^- + \Delta \theta_{k-1}/2) \\ \hat{\theta}_{k-1}^- + \Delta \theta_{k-1} \end{bmatrix} \quad \text{Formula 18}$$

A state vector $\hat{x}_k^- = [\hat{x}_k^-, \hat{y}_k^-, \hat{\theta}_k^-]^T$ is the predicted pose of the mobile robot at sampling time k. If the initial pose is given, the pose of the mobile robot is represented x, y and θ in a global coordinate frame. Also, the uncertainty of the predicted pose of the mobile robot continuously increases by the accumulative error of the odometry information. Herein, the uncertainty may be represented by the error covariance matrix as shown in formula 14, and the uncertainty $Q_{k-1}$ of odometry information at sampling time k−1 is represented by formula 19.

$$Q_{k-1} = \begin{bmatrix} k_r^2 |\Delta s_{k-1,r}| & 0 \\ 0 & k_l^2 |\Delta s_{k-1,l}| \end{bmatrix} \quad \text{Formula 19}$$

Herein, where, $k_r$ and $k_l$ are error constants of each wheel that depend on the mobile robot or the environment. In the present invention, the error constants are pre-set.

As described above, when the odometry information is applied to the Extended Kalman Filter and the location of the mobile robot is predicted, the measurement values measured by the DGPS module and the IMU are applied to the estimation step of the Extended Kalman Filter, and the location of the mobile robot is corrected. In the present invention, the position of the mobile, which is predicted based on the odometry information and the measurement values measured by the DGPS module and the IMU, is applied to the estimation step of the Extended Kalman Filter, such that the position of the mobile robot is predicted.

In more detail, the error of the measurement values of DPGS module comprises HDOP (Horizontal Dilution of Precision) error which is a geometric error caused by the geometric constellation of satellites, and Pseudo-range error. Therefore, the error covariance of the DGPS module is given by formula 20.

$$R_{DGPS} = \begin{bmatrix} \sigma_{x,DOP}^2 & \sigma_{xy,DOP} \\ \sigma_{yx,DOP} & \sigma_{y,DOP}^2 \end{bmatrix} \times \sigma_{UERE}^2 \quad \text{Formula 20}$$

In formula 20, the left term is the error covariance of the HDOP (Horizontal Dilution of Precision) error and the right term is the error covariance of the Pseudo-range error.

The measurement values of the IMU are the orientation angle, and the error of the measurement values of the IMU comprises an error of the orientation angle. Herein, the error covariance of the measurement values of the IMU may be represented as $\sigma_\theta^2$.

Then, an error covariance (hereinafter, defined as a first correcting error covariance) with the error covariance of the DGPS module and the error covariance of the IMU is represented by formula 21.

$$R_{k,1} = \begin{bmatrix} R_{DGPS} & 0 \\ 0 & R_{IMU} \end{bmatrix} \quad \text{Formula 21}$$
$$= \begin{bmatrix} \sigma_x^2 & \sigma_{xy} & 0 \\ \sigma_{yx} & \sigma_y^2 & 0 \\ 0 & 0 & \sigma_\theta^2 \end{bmatrix}$$

Also, the measurement value of the DGPS module and the measurement value of the IMU are provided as the measurement vector in the global coordinate frame, as given by formula 22.

$$z_{k,1} = [x_{DGPS,k} \, y_{DGPS,k} \, \theta_{IMU}]^T \quad \text{Formula 22}$$

Since a measurement covariance matrix $R_k$ in formula 15 and 17 is defined by formula 21, an observation model is represented as formula 23.

$$h(\hat{x}_k^-, k) = [\hat{x}_k^- \, \hat{y}_k^- \, \hat{\theta}_k^-]^T \quad \text{Formula 23}$$

A measurement Jacobian matrix $H_k$ is given by formula 24.

$$H_k = \frac{\partial h(\hat{x}_k^-, k)}{\partial \hat{x}_k^-} = \begin{bmatrix} 1 & 0 & 0 \\ 0 & 1 & 0 \\ 0 & 0 & 1 \end{bmatrix} \quad \text{Formula 24}$$

The observation model, the measurement Jacobian matrix, etc. obtained by above-described process are applied to formulas 15 to 17, such that the corrected position of the mobile robot, as represented in formula 16 is obtained.

As described above, when the location correction of the mobile robot on the basis of the measurement values of the DGPS module and the IMU is completed, the correction step using the scan data from the laser range finder is conducted.

First, the curb information is extracted of the road on the basis of the scan data of the laser range finder which is installed in the mobile robot. In the present invention, the curb information is extracted by using the method for extracting the curb of the road which is described above, as one example.

Then, the extracted curb information and the position of the mobile robot corrected by above-mentioned correction process are applied to the estimation step of the Extended Kalman Filter, such that the position of the mobile robot is corrected. Herein, as mentioned above, the curb information comprises the distance information between the mobile robot and the extracted curb and the angle information between the mobile robot and the extracted curb.

Then, an error covariance (hereinafter, defined as a second correcting error covariance) is calculated on the basis of the error between the line map and the curb information (the distance information and the angle information), such that the second correcting error covariance is applied to the correction of the position error.

Figure 10:
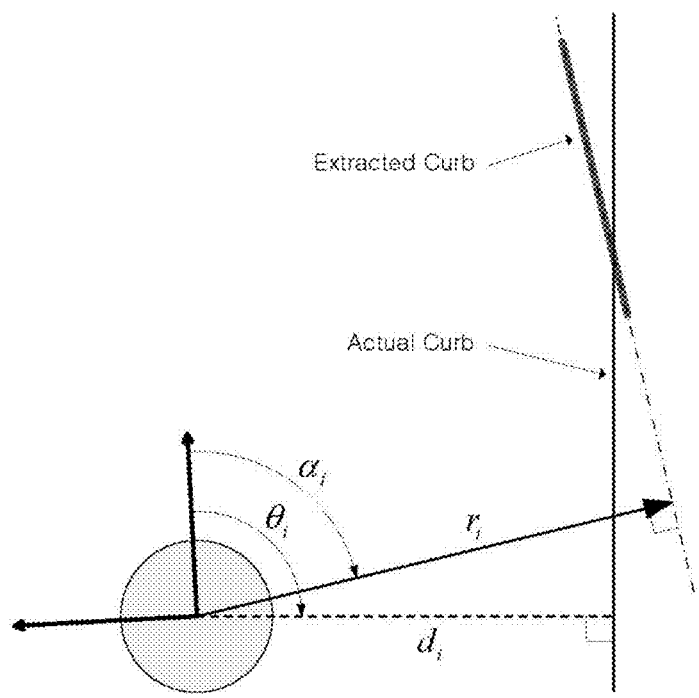
Figure 11:
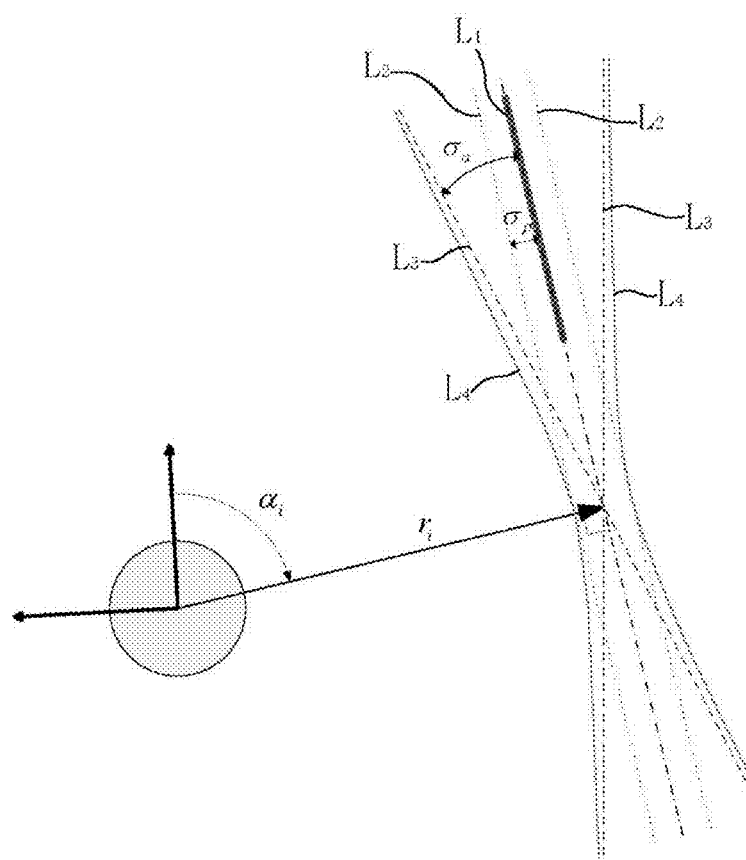
Figure 12:
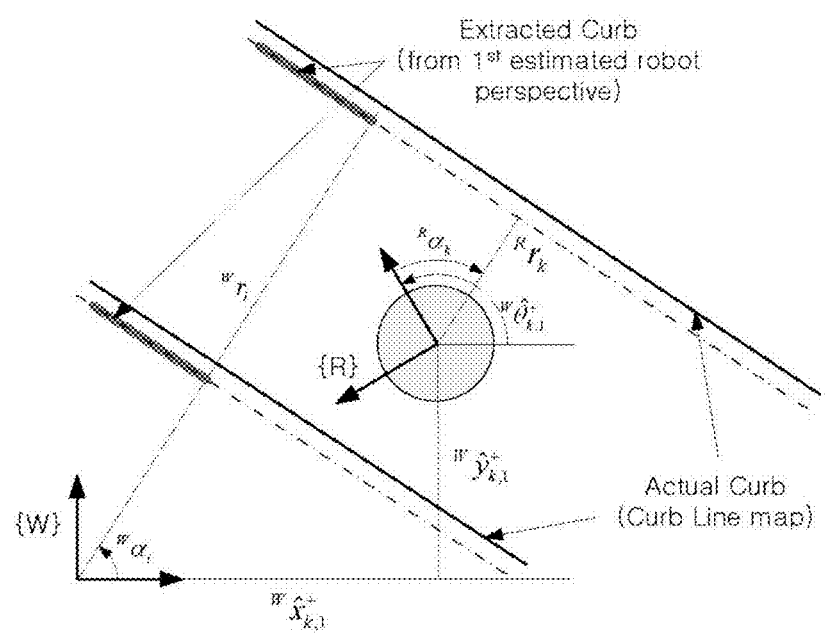

In more detail, referring to FIGS. 10 to 12, the geometry of the extracted curb versus an actual curb in the line map is depicted in FIG. 10. The difference between the extracted curb and the actual curb in the line map is extracted as the error of the curb information, and a curb angle error and a curb distance error are represented as formulas 25 and 26.

$$\alpha_i = \theta_i + \epsilon_{\alpha_i} \quad \text{Formula 25}$$

$$r_i = d_i + \epsilon_{r_i} \quad \text{Formula 26}$$

An estimation errors $\epsilon_{\alpha_i}$ and $\epsilon_{r_i}$ represent the variance of curb information from the actual curb. Therefore, when the estimation errors $\epsilon_\alpha$ and $\epsilon_r$ are provided from large number of the curb information, the covariance matrix of the extracted curb information $(\alpha, r)$, i.e., the second correction covariance matrix is represented as formula 27.

$$R_{curb} = \begin{bmatrix} \sigma_\alpha^2 & \sigma_{\alpha r} \\ \sigma_{r\alpha} & \sigma_r^2 \end{bmatrix} = \begin{bmatrix} E(\epsilon_\alpha \epsilon_\alpha^T) & E(\epsilon_\alpha \epsilon_r^T) \\ E(\epsilon_r \epsilon_\alpha^T) & E(\epsilon_r \epsilon_r^T) \end{bmatrix} \quad \text{Formula 27}$$

By using the second correction error covariance matrix of the curb information, the curb information and the curb variance is represented as shown in FIG. 11. The uncertainty of the curb information in distance direction is represented dotted lines ($L_2$) parallel to the curb information ($L_1$). In FIG. 11, the dashed lines ($L_3$) represent angular uncertainty of the curb information. The total uncertainty bounds for the curb information are represented as curved line ($L_4$) by uncertainties of distance and angle.

Hereinafter, the position correction of the mobile robot is explained in more detail. As described above, the curb information has the angle information and the distance information, and is represented as the measurement vector as shown in formula 28. For the case in which the curbs are extracted on both sides of the road, there are two measurement vectors for the left curb and the right curb.

$$z_{curb,k} = [R_{\alpha_{curb,k}} R_{r_{curb,k}}]^T \quad \text{Formula 28}$$

The second correction error covariance matrix is represented as formula 29. If the curbs are extracted on both sides of the road, the second correction error covariance matrix is applied to each side.

$$R_k = R_{curb,k} = \begin{bmatrix} \sigma_\alpha^2 & \sigma_{\alpha r} \\ \sigma_{r\alpha} & \sigma_r^2 \end{bmatrix} \quad \text{Formula 29}$$

The pose of the mobile robot is corrected by comparing the measurement vector in formula 28 against the line map. FIG. 12 represents the relation of the extracted curb information and the curb in the line map. Referring to FIG. 12, the curb information is matched up with the $i^{th}$ line corresponding to the curb in the line map. The observation model for the $i^{th}$ line $w_{z_i} = [w_{\alpha_i} w_{r_i}]^T$ and the pose of mobile robot at sampling time k are defined as formula 30.

$$h_{curb}(\hat{x}_{k,1}^+, k, i) = \begin{bmatrix} {}^w\alpha_i - \hat{\theta}_{k,1}^+ \\ {}^w r_i - \{\hat{x}_{k,1}^+ \cos {}^w\alpha_i + \hat{y}_{k,1}^+ \sin {}^w\alpha_i\} \end{bmatrix} \quad \text{Formula 30}$$

Then, the measurement jacobian matrix $H_k$ is defined as formula 31.

$$H_k = H_{curb,k} = \frac{\partial h(\hat{x}_{k,1}^+, k, i)}{\partial \hat{x}_{k,1}^+} = \begin{bmatrix} 0 & 0 & -1 \\ -\cos {}^w\alpha_i & -\sin {}^w\alpha_i & 0 \end{bmatrix} \quad \text{Formula 31}$$

The observation model, the measurement Jacobian matrix, etc. for the curb information obtained by the above-described process are applied to formula 15 to 17, such that the corrected position of the mobile robot as represented in formula 16, that is, the corrected position of the mobile robot using the curb information is calculated.

Although several exemplary embodiments of the present invention have been illustrated and described, it will be appreciated that various modifications can be made without departing from the scope and spirit of the invention as disclosed in the accompanying claims. The scope of the present invention will be determined the accompanying claims and their equivalents.?

The invention claimed is:

1. A method for extracting a curb of a road using a laser range finder comprising following steps:
   (a) extracting, by a processor, a road surface and line segments from scan data of the laser range finder;
   (b) extracting, by the processor, a plurality of curb candidate line segments among the line segments on the basis of an angle between the road surface and the line segment;
   (c) extracting, by the processor, a plurality of curb candidates having a plurality of curb properties, wherein each of the plurality of curb candidates is generated by combining a couple of the plurality of curb candidate line segments;
   (d) applying, by the processor, the plurality of the curb candidates to a Kernel Fisher Discriminant Analysis to extract a final curb; and
   (e) correcting a position of a mobile robot using the final curb.

2. The method for extracting the curb of the road using the laser range finder according to claim 1, wherein the step (c) comprises following steps:
   (c1) extracting, by the processor, a right curb candidate line segment and a left curb candidate line segment from the plurality of curb candidate line segments;
   (c2) calculating, by the processor, a difference between a distance to an extracted road surface and a distance to the right curb candidate line segment and/or the left curb candidate line segment;
   (c3) calculating, by the processor, an angular difference between the right curb candidate line segment and the left curb candidate line segment;
   (c4) calculating, by the processor, a difference between a road width and a distance between the right curb candidate line segment and the left curb candidate line segment; and
   (c5) extracting the plurality of curb candidates having the plurality of curb properties with values calculated in the step (c2), (c3), and (c4).

3. The method for extracting the curb of the road using the laser range finder according to claim 2, wherein vector data are extracted as the plurality of curb candidates and wherein elements of the vector data comprise the values calculated in the step (c2), (c3), and (c4).

4. The method for extracting the curb of the road using the laser range finder according to claim 3, wherein the step (d) comprises following steps:
   (d1) setting-up, by the processor, a discriminant function via applying a plurality of training data which are classified as a curb class and a non-curb class to the Kernel Fisher Discriminant Analysis;
   (d2) applying, by the processor, a curb candidate to the discriminant function to classify the curb candidate as one of the curb class and the non-curb class; and
   (d3) extracting, by the processor, the curb candidate, which is classified as the curb class, as the final curb in the step (d2).

5. The method for extracting the curb of the road using the laser range finder according to claim 4, wherein the discriminant function in the step (d1) is generated as an eigenvector maximizing an object function in a formula which is defined as $$J(\alpha) = \frac{\alpha^T S_B^\Phi \alpha}{\alpha^T S_W^\Phi \alpha}$$

(here, $J(\alpha)$ is the object function, $S_B^\Phi$ is a between-class variance matrix, $S_W^\Phi$ is a within-class variance matrix, and $\alpha$ is the eigenvector).

6. The method for extracting the curb of the road using the laser range finder according to claim 5, wherein in the step (d2), Mahalanobis distance between each class and the curb candidate is calculated, and the curb candidate is classified as one of the curb class and the non-curb class which possesses the smaller Mahalanobis distance.

7. The method for extracting the curb of the road using the laser range finder according to claim 6, wherein the Mahalanobis distance is calculated by $$d(y_{test}, \mu_c^\Phi) = \frac{(y_{test} - \mu_c^\Phi)^2}{(\sigma_c^\Phi)^2}$$

(here, $\mu_c^\Phi$ and $\sigma_c^\Phi$ are the mean and the standard deviations, respectively, of the training data, the curb class, and the non-curb class in a one-dimensional solution space).

8. A method for localizing of a mobile robot using curb information of a road comprising following steps:
- (A) predicting a position of the mobile robot by applying odometry information of the mobile robot to an Extended Kalman Filter;
- (B) applying a measurement value measured by a Differential Global Positioning System (DGPS) module installed on the mobile robot and an inertial sensor and the position of the mobile robot predicted in the step (A) to the Extended Kalman Filter to correct the position of the mobile robot predicted in the step (A);
- (C) extracting curb information of the road on the basis of scan data of a laser range finder which is installed on the mobile robot; and
- (D) applying the extracted curb information and the position of the mobile robot which is corrected in the step (B) to the Extended Kalman Filter to correct the position of the mobile robot which is corrected in the step (B).

9. The method for localizing of the mobile robot using curb information of the road according to claim 8, wherein in the step (C), the method of extracting curb information comprises:
- (a) extracting a road surface and line segments from scan data of the laser range finder;
- (b) extracting a plurality of curb candidate line segments among the line segments on the basis of an angle between the road surface and the line segment;
- (c) extracting a plurality of curb candidates having a plurality of curb properties, wherein each of the plurality of curb candidates is generated by combining a couple of the plurality of curb candidate line segments; and
- (d) applying the plurality of the curb candidates to a Kernel Fisher Discriminant Analysis to extract a final curb; and
- (e) correcting a position of a mobile robot using the final curb.

10. The method for localizing of the mobile robot using curb information of the road according to claim 9, wherein in the step (B), an error for the measurement value of the DGPS module comprises a HDOP (Horizontal Dilution of Precision) error and a Pseudo-range error which is a geometric error according to a geometric constellation of satellites; wherein an error for the measurement value of the inertial sensor comprises an orientation error; and wherein an error covariance applied to the Extended Kalman Filter comprises an error covariance for the measurement value of the DGPS module and an error covariance for the measurement value of the inertial sensor.

11. The method for localizing of the mobile robot using curb information of the road according to claim 9, wherein in the step (D), the curb information comprises distance information between the mobile robot and an extracted curb, and angle information between the mobile robot and the curb, and wherein an error covariance for the curb information applied to the Extended Kalman Filter is calculated on the basis of an error between a predetermined line map and the distance and angle information.

* * * * *